US009785395B2

(12) United States Patent
Buchner (10) Patent No.: US 9,785,395 B2
(45) Date of Patent: *Oct. 10, 2017

(54) INTERACTIVE SYNCHRONIZED MULTI-SCREEN DISPLAY

(71) Applicant: Harborside Press, LLC, Cold Spring Harbor, NY (US)

(72) Inventor: Frank Buchner, Cold Spring Harbor, NY (US)

(73) Assignee: HARBORSIDE PRESS, LLC, Huntington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/744,575

(22) Filed: Jun. 19, 2015

(65) Prior Publication Data

US 2016/0011843 A1    Jan. 14, 2016

Related U.S. Application Data

(63) Continuation of application No. 13/837,445, filed on Mar. 15, 2013, now Pat. No. 9,092,184.

(60) Provisional application No. 61/663,211, filed on Jun. 22, 2012.

(51) Int. Cl.
*G09G 5/00* (2006.01)
*G06F 3/14* (2006.01)
*G06F 3/147* (2006.01)

(52) U.S. Cl.
CPC ............ *G06F 3/1446* (2013.01); *G06F 3/147* (2013.01); *G06F 3/1438* (2013.01); *G09G 2354/00* (2013.01); *G09G 2356/00* (2013.01); *G09G 2370/16* (2013.01)

(58) Field of Classification Search
CPC ...... G06F 3/147; G06F 3/1423; G06F 3/1431; G06F 3/1446; G06F 3/1438; H04N 21/43637; G09G 2370/16; G09G 2354/00; G09G 2356/00
See application file for complete search history.

(56) References Cited

U.S. PATENT DOCUMENTS

2010/0053164 A1* 3/2010 Imai ...................... G06F 3/011
                                                        345/427
2013/0021223 A1* 1/2013 Ichieda ................ H04N 9/3197
                                                        345/2.3

* cited by examiner

*Primary Examiner* — Adam R Giesy
(74) *Attorney, Agent, or Firm* — Meister Seelig & Fein LLP (57) ABSTRACT

Systems and method for displaying interactive content. The systems and method include a host device configured to receive register commands from a plurality of client devices, the register commands including arrangement information of the plurality of client devices. The host device registers the plurality of client devices with the host device. The host device is further configured to determine a position for each of the plurality of client devices based on the arrangement information, and transmit display instructions to the plurality of client devices to start display of respective portions of a whole presentation corresponding to the position of the client devices in a synchronized fashion.

20 Claims, 6 Drawing Sheets

INTERACTIVE SYNCHRONIZED MULTI-SCREEN DISPLAY

CROSS REFERENCE TO RELATED APPLICATIONS

This application claims the priority of U.S. Provisional Application No. 61/663,211, entitled "INTERACTIVE SYNCHRONIZED MULTI-SCREEN DISPLAY," filed on Jun. 22, 2012, the disclosure of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to the synchronization of a display using a plurality of screens, and in particular, using tablet devices. A system and process is provided where computerized displays (tablet PCs, tablet computers, smartphones, etc.) can be placed in certain configurations and synchronized to generate both a unified and individual user experience.

BACKGROUND OF THE INVENTION

In the past, large displays have been created by using a computer or electronic device to drive multiple displays into a single display matrix. This matrix requires specialized programming and electronics capable of driving all the displays in unison. Examples of such displays include electronic billboards and signs. However, these large displays were not intended for user interaction. As such, people would walk past such electronic displays and may not pay much attention to them.

Tablet computing devices such as Apple's iPad® have gained in popularity as the computing device of choice over traditional computers. These tablet devices have become increasingly popular because of their portability, weight, low power consumption, ease to set up, and ability to rapidly obtain media, e.g., via wireless connections to the Internet. In addition to the foregoing, tablet computing devices are fairly easy to use because of their intuitive user interfaces. Tablet devices have advantages over traditional electronic displays and offer features that the displays cannot provide. As such, tablet devices may be utilized in an advantageous manner to enrich a user's experience in advertising products and services.

Currently, existing displays and signs do not provide interactive features and content for users to engage with. There is thus a need to provide a user-approachable display system that allows users to explore additional content experiences.

SUMMARY OF THE INVENTION

The present invention provides systems and method for displaying interactive content. A system according to one embodiment includes a host device configured to receive register commands from a plurality of client devices, the register commands including arrangement information of the plurality of client devices. The host device is further configured to register the plurality of client devices with the host device, determine a position for each of the plurality of client devices based on the arrangement information, and transmit display instructions to the plurality of client devices to start display of respective portions of a whole presentation corresponding to the position of the client devices in a synchronized fashion.

The plurality of client devices may be mounted on a surface in an arrangement consistent with the arrangement information. The arrangement information indicates a position of a given client device within a multiple screen display arrangement. In some embodiments, the arrangement information includes a row and column number associated with the position of a given client device. Each of the register commands may also include the client devices' Internet Protocol address.

According to one embodiment the host device is configured to generate a scannable configuration code. The scannable configuration code includes configuration information of the host device usable by the plurality of client devices to communicate with the host device. The scannable configuration code may be a QR code. In another embodiment, the scannable configuration code includes a radio-frequency identification code that is transmittable via at least one of near field communication, Bluetooth, and radio frequency identification tag technologies.

The plurality of client devices may be arranged in a multi-dimensional array of devices. In some embodiments, the host device may be one of the plurality of client devices where the host is operable to perform both host and client functions.

The plurality of client devices are configured to provide an individual experience upon user interaction. The user interaction may interrupt the display of respective portions of the whole presentation at any given time on a given one of the plurality of client devices during the presentation. An individual experience can provide at least one of: games, quizzes, images, documents, and additional videos. The host device may be further configured to transmit session data to the plurality of client devices providing the individual experience. Providing the individual experience includes replacing the display of respective portions of the whole presentation with the individual experience. The plurality of client devices are also configured to restore the display of respective portions of the whole presentation upon completion of the user interaction.

A system according to another embodiment includes a host device configured to receive register commands from a plurality of client devices, the register commands including arrangement information of the plurality of client devices, register the plurality of client devices with the host device. The host device is further configured to determine a position for each of the plurality of client devices based on the arrangement information, and transmit display instructions to the plurality of client devices to start display of respective portions of a whole presentation corresponding to the position of the client devices in a synchronized fashion. The system further includes the plurality of client devices in an arrangement consistent with the arrangement information configured to receive the display instructions from the host device, display the respective portions of a whole presentation, and provide an individual experience in response to a user interaction.

Non-transitory computer readable media according to one embodiment comprises program code that when executed by a programmable processor causes execution of a method for displaying interactive content. The computer readable media comprising computer program code for receiving register commands from a plurality of client devices, the register commands including arrangement information of the plurality of client devices, computer program code for registering the plurality of client devices with the host device, computer program code for determining a position for each of the plurality of client devices based on the arrangement information, and computer program code for transmitting display instructions to the plurality of client devices to start display of respective portions of a whole presentation corresponding to the position of the client devices in a synchronized fashion.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Figure 1:
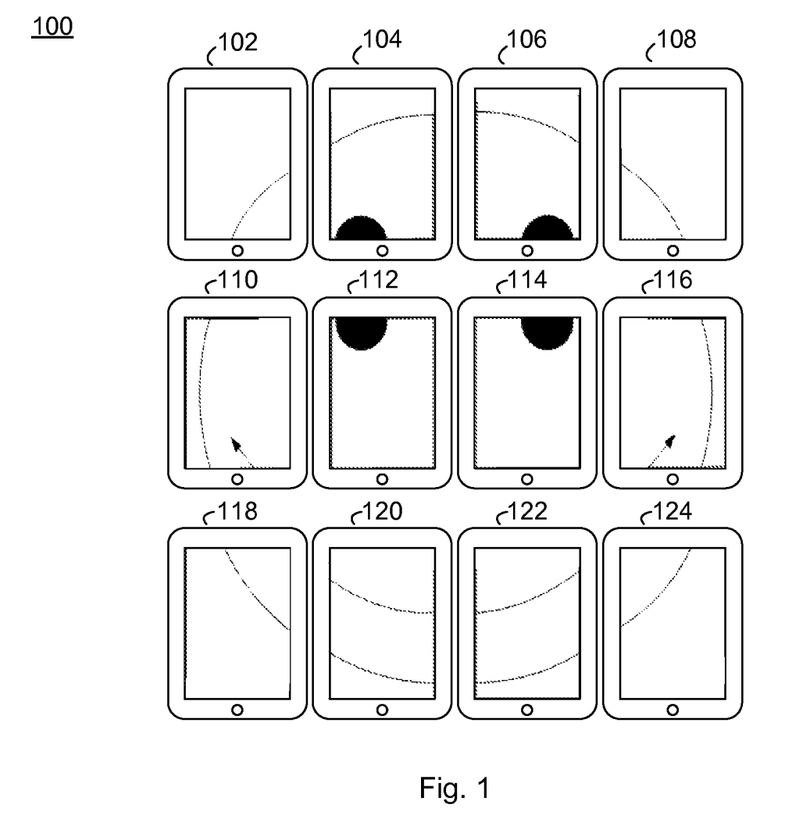
FIG. 1 illustrates a computing system according to an embodiment of the present invention.

FIG. 1 presents a computing system according to an embodiment of the present invention. A presentation divided among 12 tablet computing devices is shown in FIG. 1. Each of tablets 102, 104, 106, 108, 110, 112, 114, 116, 118, 120, 122, and 124 are arranged adjacently from one another in computing system 100 and synchronized such that, collectively, they display a larger presentation. Tablets 102 through 124 may be individually controlled and coordinated in unison such that they display a proper image based on their configuration with respect to each other. Individually, each tablet may display only a portion of the larger presentation but when arranged in a proper order or sequence, the tablet devices combine to create the entirety of the larger presentation. Such an aggregation of tablet devices may also be used for moving images (such as video and animation) in which the moving images are divided up into quadrants or sections where each tablet device is responsible for displaying its own piece of an overall moving image. The tablet devices may be integrated into an enclosure to form a "wall," array, or matrix of tablet/touchscreen displays. The present system may be used to present ideas and concepts in a public setting such as at a show, fair, convention, or forum where a variety of companies or organizations may set up tables and/or booths to provide information about their organization, products, research, and services. In addition, the present system may be used at sporting events, concerts, retail locations, galleries, museums, etc.

A "tablet" device refers to any self-contained computing device with a visual display monitor, where the visual tablet device is coupled with a computer that drives the tablet device without requiring any externally connected hardware. This may include any such device regardless of screen size, from devices with small screen sizes (for example, smartphones), mid-sized personal tablet devices (for example, an Apple iPad®), or large tablet devices (e.g., flat screen monitors with integrated computers or smart TV's). A tablet device may vary in terms of capabilities or features. Claimed subject matter is intended to cover a wide range of potential variations. For example, a tablet device may also include a numeric keypad or a display of limited functionality, such as a monochrome liquid crystal display (LCD) for displaying text. In contrast, however, as another example, a tablet device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display.

A tablet device may include or may execute a variety of operating systems, including a personal computer operating system, such as a Windows, Mac OS or Linux, or a mobile operating system, such as iOS, Android, or Windows Mobile, or the like. A tablet device may include or execute a variety of possible applications, such as a software application enabling communication with other devices, such as communicating one or more messages. A tablet device may also include or execute an application to communicate content, such as, for example, textual content, multimedia content, or the like. A tablet device may also include or execute an application to perform a variety of possible tasks, such as browsing, searching, playing various forms of content, including locally stored or streamed video, or games. The foregoing is provided to illustrate that claimed subject matter is intended to include a wide range of possible features or capabilities.

According to one embodiment, system 100 allows the synchronization of multiple tablet computers such that when aggregated together, the array of tablets generates a larger interactive experience including a "main presentation," which is discussed in further detail below. The tablet devices may be communicatively coupled by means of a network, and can operate individually or as a single modular unit. The network may be any suitable type of network allowing transport of data communications across thereof. A network may couple devices so that communications may be exchanged, such as between a server and a tablet device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire line type connections, wireless type connections, or any combination thereof.

The tablet devices may be synchronized with each other via wired or wireless networking protocols (such as TCP/IP, NFC and Bluetooth (IEEE 802.15.1) technology) and can have either a separate dedicated server or device that controls a main presentation. In one embodiment, a host device is a tablet computing device external from the aggregated tablet devices utilized to synchronize and control a tablet device array. An external server or host device may control the visual display of every tablet synchronized within the tablet device array.

Figure 2:
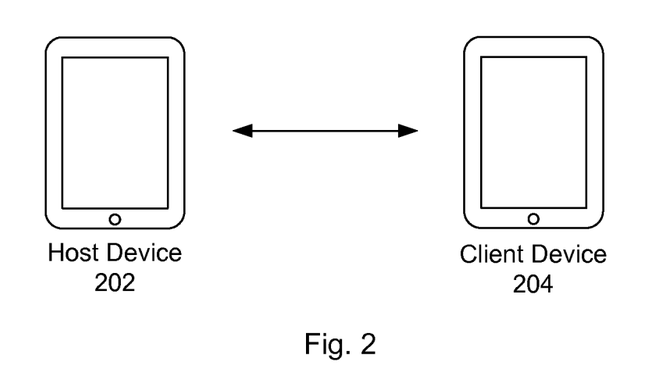
FIG. 2 illustrates a host and client device according to an embodiment of the present invention.

FIG. 2 illustrates a host and client device according to an embodiment of the present invention. Host device 202 comprises a tablet device operating in a host mode to communicate with other tablet devices such as client device 204 in order to synchronize the devices. The tablet devices may use a wireless connection over, for example, TCP/IP to communicate. A single host device may have dual responsibilities assigned to it—a synchronization server and a content server. According to one embodiment, the tablet devices used in the present system may also function in either a host mode or a client mode. In one embodiment, host device 202 may also provide content in addition to synchronization commands to the client device 204.

A client device 204 may dynamically generate its own content, have its content previously pre-loaded on it, or receive the content from a remote device. The content can take the form of image or video data, documents (such as Portable Document Format (PDF) files, word processor files, spreadsheets, etc.), or software instructions on how to dynamically generate the visual experience unique to the individual display. According to one another embodiment, an external content server or device may provide content to client device 204 (either via wired or wireless methods). The content server can be an external device responsible for displaying content to each of the client devices. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In the illustrated example, host device 202 is operating in a host mode and client device 204 is an exemplary tablet device operating in a client mode. Each individual device, such as client device 204, is able to render an appropriate piece of content it needs to display to wholly form a larger display. Tablet devices used in the present system may function either in a host mode or a client mode. In one embodiment, host device 202 may be a tablet device external to a tablet device array or matrix comprised of a plurality of tablet devices arranged for presentational display. The array may be either a single-dimensional or multi-dimensional array. In another embodiment, host device 202 may be a given one of a plurality of tablet devices in a tablet device array. A host device 202 within a tablet device array may also perform host operations as well as client operations. For example, host device 202 may be responsible for displaying its own piece of content as well as providing synchronization responsibilities to other tablet devices.

Figure 3:
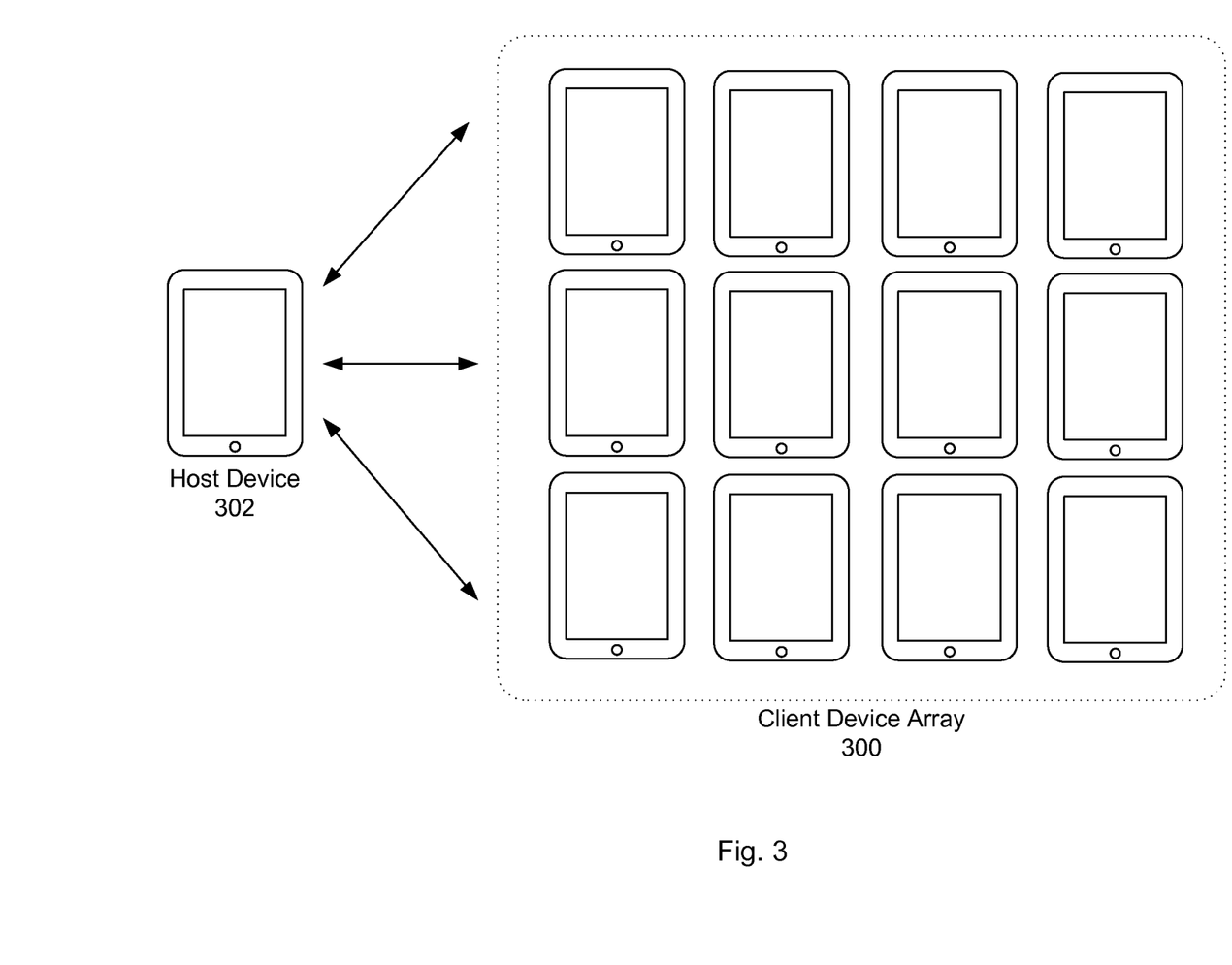
FIG. 3 illustrates a computing system according to an embodiment of the present invention.

FIG. 3 illustrates a computing system according to an embodiment of the present invention. Client device array 300, as illustrated, is in communication with host device 302. Client device array 300 includes a plurality of client tablet computing devices configured and arranged adjacently to collectively form a single display. Each of the client devices are configured such that they may display a portion of a main presentation. When the client devices are arranged adjacently (e.g., into a matrix), the plurality of the portions of the main presentation are united to form a wholly formed display of the main presentation. The client device array 300 may comprise, for example, a plurality of client tablet devices mounted to a wall or a flat surface such as a table. It should also be noted that the array of tablet devices which form the larger overall display need not be from the same manufacturer or running the same operating system.

In the illustrated embodiment, the client device array 300 is arranged in a '3×4' array. However, the number of devices shown in client device array 300 as shown in FIG. 3 is merely exemplary and is not a limitation in the number of tablet devices comprising client device array 300. Client device array 300 may in fact include either more or less tablet devices than depicted. In addition to the plurality of client tablet devices, client device array 300 may also comprise device chargers, power strips, and wireless routers. Each of the client devices may be driven by an external device (host device 302), which has been assigned the responsibility for the synchronization of the client devices and for supplying the display instructions and/or content required by each of the individual client devices. As illustrated in FIG. 3, host device 302 is a separate device that is not a member of the collection of client devices in client device array 300. However, in other embodiments, host device 302 may a member of client device array 300 operating with both host and client functionality.

A scannable configuration code may be generated on the host device 302. The scannable configuration code may be a barcode such as a QR code that is automatically generated upon initiation of a program providing the host functionality on the host device 302. In one embodiment, the scannable configuration code may be displayed on a user interface of the host device. The displayed code is operable for scanning by client devices in a multiple screen display configuration to allow the client devices to connect with the host device 302. The scannable configuration code may include an IP address, a communication port number, and any other information that may be required for establishing a connection between two computing devices. Information in the configuration code is able to allow client devices to connect and transmit messages, data, or commands to the host device. Alternatively, the same information in the configuration code may be manually entered on the client devices.

In one embodiment, the present invention provides an interactive presentation "wall" where users can explore and interact with the presentation material. The main presentation may be a pre-programmed presentation, running the client devices in client device array 300 as one synchronized display. The display provides a single, large synchronized display that can be viewed from afar to draw attention. The synchronized display comprising client device array 300 may present a main presentation including videos with interactive features and additional information regarding, for example, a product or service.

Host device 302 comprises a tablet device configurable in a host mode. The host device 302 includes a synchronization server responsible for ensuring that each client device in client device array 300 shows its appropriate piece of content at the proper time. Synchronization data for a main presentation may be sent simultaneously to all of the client devices within client device array 300. A main presentation may comprise a visual presentation utilizing at least a plurality of the client devices (e.g., all or a majority of the client devices) within client device array 300. The main presentation may include videos, images, slideshows, etc., displayed on the client device array 300. According to one embodiment, client device array may alternate display of multiple main presentations.

For a main presentation, once each device has conformed synchronization, corresponding content pieces that each of the client devices should display are sent to the client devices. When displaying images, content pieces may include individual image file identifiers or image file identifiers with coordinate specifications for an area of an image that a specific client device is to display. For video content, the content pieces may include video file identifiers or video file identifiers also with coordinate specifications as well as time-codes for an area and time reference from which to start playing a video. Each client device in client device array 300 may contain pre-loaded and/or pre-rendered content required for display by the device. In one embodiment, all of the necessary graphics, documents, images, videos and other creative assets may be stored on each client device. This allows the client devices to be positioned anywhere in the group of client devices. Preloading content to the client device also obviates the need for a host device or a content server to stream or send content or video to each client for display over a wireless connection, which may result in a smoother and more reliable display of high resolution video. In another embodiment, each client device may dynamically generate (via a software application or algorithm) its piece of the overall display experience.

Each of the client devices within client device array 300 is receptive of user interactions. A user may interact with or otherwise remove any individual tablet from client device array 300 at any point during presentation of a main presentation. For example, while a main presentation is displayed on client device array 300, a user may tap on the screen of one of the plurality of client devices. User interactions may include taps, swipes, or any other gestures on the touch screen of a client device. In response to a user interaction, the client device may respond accordingly to a predetermined response.

Host device 302 may receive an indication of a user interaction from the client device and transmit a response command to the client device. The response command may instruct the client device to begin providing the predetermined response. The predetermined response may be related to the main presentation. In one embodiment, the predetermined response may transition display of the main presentation to an individual experience. When a user interacts with a device displaying a main presentation, a main menu layer may overlay the main presentation on the client device's display. The main menu may offer options for accessing other interactive functions available on the client device for the individual experience. Available activities include requesting for additional information associated with the main presentation (e.g., for a product or service), subscribing to future information not immediately available, selecting information to have e-mailed directly to a user or delivered by a local representative, checking in, tracking a user's progress or status, requesting an appointment or meeting, providing feedback and comments on a main presentation or individual experiences, entering a raffle or sweepstakes, participating in interactive games, taking quizzes, and viewing videos.

While the user interacts with the individual client device, the remaining client devices remain part of the main presentation, uninterrupted. It should be noted that some functions of the individual experience may engage not just the individual client device, but also other nearby client devices. In one embodiment, a plurality of the client devices in the individual's immediate vicinity or surrounding the individual client device may be included in providing the personalized experience. Client devices not being used for the individual experience may maintain their synchronized display of the main presentation. During an individual experience, host device 302 may receive and transmit data to facilitate a session with the user interacting with the client.

Once the user interaction has ended, the individual client may rejoin its place in the array of client devices, and is synchronized back with the main presentation to its proper place. In such a case, the client device may transmit a signal to host device 302 that it is ready to rejoin the main presentation and the host device 302 will accordingly upload the information on how to join back in synchronization with the main presentation. The signal to rejoin the main presentation may be achieved by a command on the individual client allowing the user to inform the host device that the user has completed their interaction. Alternatively, the signal may be automatically transmitted to the host device 302 based on a pre-set inactivity timer. For example, each client device may be programmed to return to the main presentation after ten seconds, or some other pre-set time, of non-interaction from a user.

In one embodiment, a user may select an option to play a video from the main menu layer during an individual experience. A new video layer may appear over the main presentation, which may remain in the background. The new video layer is operable to play a video on the video layer. When the video ends or if the user closes the video, the video layer may be removed to reveal the main presentation layer. In another embodiment, a user may select a memory game from the menu layer in which an individual or individuals participate in choosing matching images hidden behind various "tiles." A game movie player may overlay the main presentation layer and execute the memory game. After the user has chosen to start the game via the main menu option, the main menu layer is hidden and replaced with the game.

Each client device may be assigned a single tile for the memory game. Pairs of matching images are assigned to random client devices to create pairs to be matched. When the game begins, the host device 302 is sent an "InitiateGame" message from the client device with which the user has selected the option to play a game. When the host device 302 receives the "InitiateGame" message, a tile array is initiated with pairs of tile numbers that represent the images used in the memory game. Since this is a matching game, the same two tiles will be used by two different devices, hence the array for a 12 device game may be [1,1,2,2,3,3,4,4,5,5,6,6]. The game state array may also associate a corresponding client device Internet Protocol (IP) address to the tiles assigned to each of the client device positions in client device array 300. This array may then be randomized to place the positions of the tiles in a random fashion among the client devices.

Host device 302 may then issue a "StartGame" message which signals each of the client devices which tile they are to display and to begin the game by displaying an appropriate "forward flip" animation, followed by a "back flip" animation after a one second pause. The "StartGame" message is sent to each client device individually. The number of the tile that the client should display is sent as a parameter of the message. This informs the client which tiles they should play for the flip animations. During the start of the game, a forward flip animation allows the user to get a brief view of all the different images to be matched across the array of client devices. After the back flip animation plays, users are no longer able to view the images and must select (or tap) the appropriate client displays to reveal the images "hidden" behind them. The different images displayed on the array of client devices by the forward flip are replaced with guess images after a back flip.

Each client tile may show two animations, the forward flip (a guess state to a picture state) and the back flip (the picture state to the guess state). When a user selects a client device on a first guess, the forward flip animation is played, which reveals the image assigned to the client device to the user. An "ItemFlip" command is issued to the host device by the client device to display an appropriate animation. The client device that has been selected may notify the host device 302 that it has been selected by issuing the "ItemFlip" message which contains the client device's IP address and an assigned image number. Host device 302 may store this information in memory and wait for a second guess to be made.

When a user selects a second client device for the second guess, the forward flip animation is played, revealing the image assigned to the second client device to the user. The client device that has been selected notifies the host device 302 that it has been selected by issuing the "ItemFlip" message which contains the client device's IP address and assigned image number. The host device 302 may then match the two selected device's image numbers to determine whether they are a match. If they are a match, host device 302 may score the match and send a "correct" command to each of the two selected client devices. The correct command sent from the host device 302 to the client device notifies the client device that it should display a "correct" image overlay for the memory game. Each of the two selected client devices then may overlay a "correct" image over the currently displayed image to alert the user that a match has been made.

The host device 302 may then wait for the user to select another two guesses to determine whether they are matches as well. If the user selects images on client devices that do not match, the host may send an "incorrect" message to each those client devices. The "incorrect" command notifies the client device that it should show the "incorrect" image overlay and then execute the back flip animation to return the display to the hidden state for the memory game. An "incorrect" image may briefly appear (e.g., for one second). Each of the client devices displaying the non-matching images may then execute the backwards flip animation and return to displaying a guess image. The user may repeat this process of selecting possible matching pairs until all matching pairs are identified.

Throughout the course of the game, the host device 302 may track how many tiles have been matched. When all of the matching pairs have been identified by the user, the host device may transmit a "GameOver" message and a score to at least one of the client devices. In one embodiment, when a given client device receives the "GameOver" message, it may end the game after at least one device takes a picture using a front facing camera located on each client device. The client device may then display the image captured by its camera for a few seconds and a "Winner" image is overlaid on each of the images displayed by the client devices. After the few seconds have elapsed, the game movie player is removed from the display of the client devices and display of the main presentation may resume on all the client devices.

Another feature on the main menu layer may allow a user to request information. Selection of the request information feature may bring about a registration form layer to appear over the main presentation layer. In one embodiment, a user registration may be required to request information. Data entry into the registration form layer may be entered by the user using either a virtual keyboard or a badge scan. By tapping on a field on the registration form, a virtual keyboard may be displayed on screen so that the user can type in e.g., a first name, last name, company name and email address.

Alternatively, a user may scan a badge using the front facing camera of the client device. For example, client device array 300 may be placed in conventions, fairs, or tradeshows where visitors or guests may be given identification badges. Selecting a scan badge option may trigger a client device to enter a scan barcode mode and activate the front facing camera. The user may hold their badge up to the device's front facing camera to scan and recognize the barcode to extract information associated with the barcode. The client device may use a barcode processing library such as ZXing for barcode processing.

Information extracted from the barcode may then be used to populate the appropriate fields on the registration form. A user may optionally take a picture of oneself and include it with the registration information. When the user has completed entering in their information, they may submit their information and the client device saves the information for later retrieval. In another embodiment, the information may be sent to the host device for centralized processing and for immediate reporting of the requested information. Functionality may also be added to initiate the immediate sending of information from either the client device, host device or a remotely located server.

Figure 4:
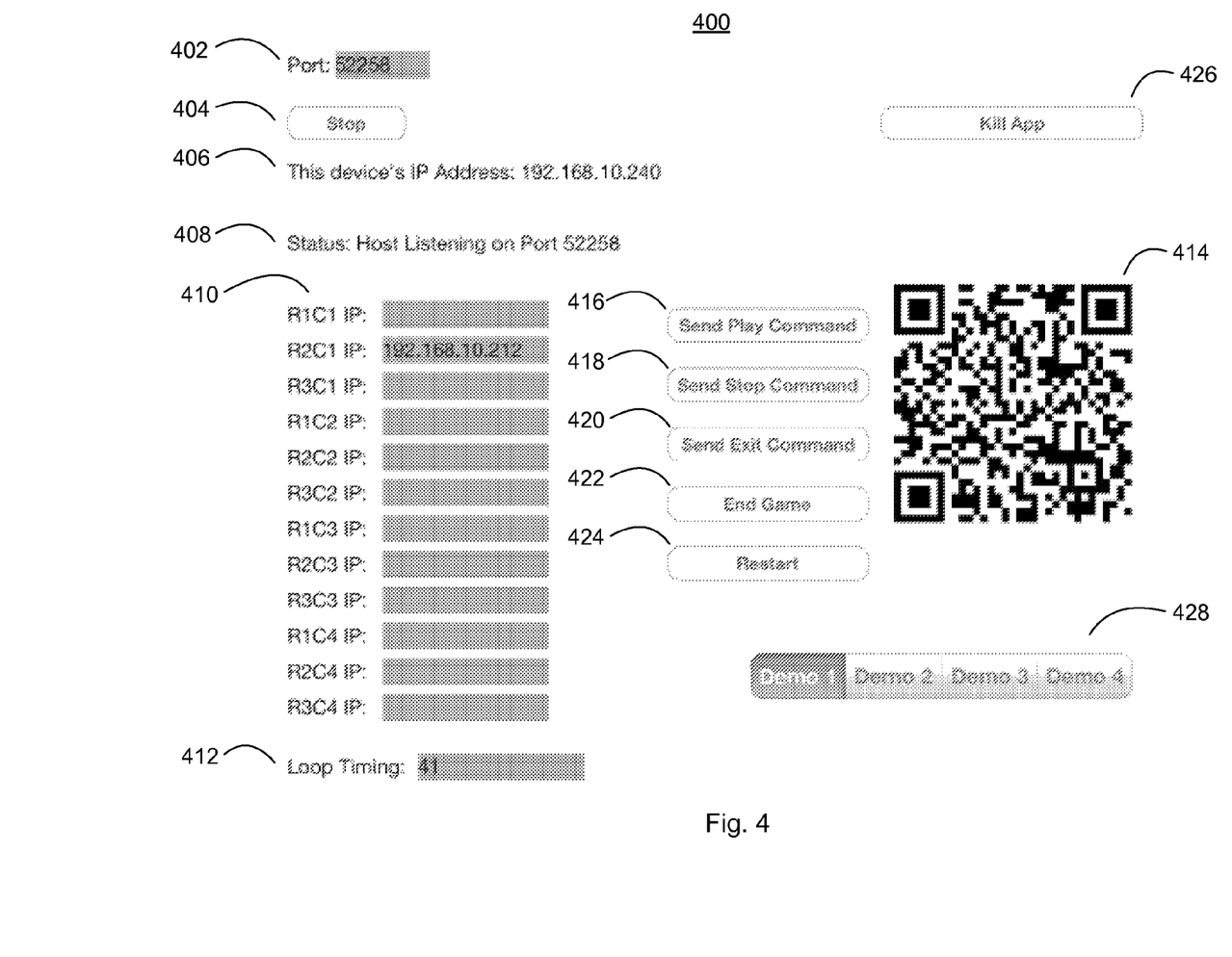
FIG. 4 illustrates an exemplary configuration interface of a device in host mode according to an embodiment of the present invention.

A tablet device may be configured as a host device with an application or software providing a user interface such as the one illustrated in FIG. 4. When the application is started, the application identifies the current IP address 406 of the device. The status 408 of the host device may be displayed.

In the current example, status 408 indicates that the host device is listening on communications port '52258'.

An "easy configuration" QR code 414 may be generated and displayed on the screen. QR code 414 may be utilized by client devices to allow them to connect with the host device. The QR code 414 may be embedded with configuration information of the host device. Configuration information may include an IP address, a communication port number, and any other information that may be required for establishing a connection between two computing devices. In one embodiment, a user of the host device may position the QR code 414 for scanning by client devices to automatically register the client devices with the host device.

The application also initiates networking functionality to listen on the device's IP address and an application defined port. In the exemplary figure, a port 402 for TCP/IP communications used by the host device may be configured to '52258'. However, this may be changed prior to host initiation if necessary. The application may use an open source package such as GCDAsyncSocket to provide core networking functionality. Networking functionality may include setting up listeners on the socket and receiving messages arriving on the specified port via TCP/IP. As client devices connect, new connections may be stored in memory on the host device by IP address for use in communications with the newly connected client devices. When a connection is terminated, the corresponding client connection information is removed from the memory of the host device.

IP addresses 410 of connected client devices are displayed on the user interface. Each of the connected client devices may be assigned coordinates or a unique row and column number corresponding to its arrangement within a client device array. The list of IP addresses are ordered accordingly to the row and column numbers of the client device array. For example, "R1C1 IP" indicates a client device configured as the first row and first column device of the client device array. "R2C1 IP" indicates a client device with an IP address of '192.168.10.212' configured as the second row and first column device of the client device array. The illustrated example is configured to support 12 devices (three rows and four columns). However, this can be changed and is not a limitation imposed by the design of the system. The maximum number of devices the system can support may be any given amount. Additionally, the client devices need not be arranged in an array and may be configured in different shapes and patterns where each row and column include varying number of client devices. The host device may be configured to show a plurality of presentations 428 on tablet devices operating in client mode. In the exemplary illustration, host device is configured to show one of four possible presentations (Demo 1, Demo 2, Demo 3 or Demo 4). This may be an arbitrary selection as the application can support an unlimited number presentations being available for display.

The configured device is able to send several commands to connected clients, both automatically and manually. Exemplary commands include, but are not limited to, the following discussion.

The stop button 404 is operable to initiate a command sent to connected client devices and cause them to stop running the main presentation or exit whatever presentation or experience they are currently displaying. Upon stopping the host operation, button 404 may dynamically change, for example, from "Stop" to "Start." To initiate host mode, the user may click the same button 404 again to re-enable host functions. The user interface may be refreshed so that IP addresses 410 of connected client devices appear and disconnected client devices are removed.

Send play command 416 may trigger client devices to initiate a main presentation loop. This command can be configured to be automatically resent after a number of seconds defined in loop timing setting 412. Loop timing setting 412 may be dynamically adjusted to allow for presentations of various lengths to be displayed. Send play command 416 can send a command to a client device to initialize a movie window or player layer. This layer may contain, for example, the Apple movie player control "MPMoviePlayer" which handles the displaying of video clips.

Send stop command 418 may send a command to a client device to remove the movie layer from display. The client may also be disconnected from the host device.

Send exit command 420 may be used to send a command to all connected clients and cause them to terminate software execution. Subsequently, the application on the host device may then shut down. Alternatively, send exit command 420 may be sent to a client device such that when a client receives the command, an application on the client device is terminated.

End game command 422 may be sent to all connected clients currently presenting a game and will stop the game to resume displaying the main presentation. This command allows a person running the client device array or wall (e.g., an administrator) to reset the client displays should a person choose to abandon playing a game.

A restart 424 command may be sent to all client devices and causes the connected client devices to stop whatever interaction they are displaying, clear the main presentation loop and restart the main presentation from the beginning. The restart 424 command may be used to restore the synchronization of devices for the presentations should one of the client devices fall out of synchronization or has malfunctioned.

Kill app command 426 may be used to terminate the configuration application running on the host device. The host terminates but does not send any command to the connected clients. When the host is terminated, all connected clients may continue to run but will not be able to communicate with the host or each other.

Figure 5:
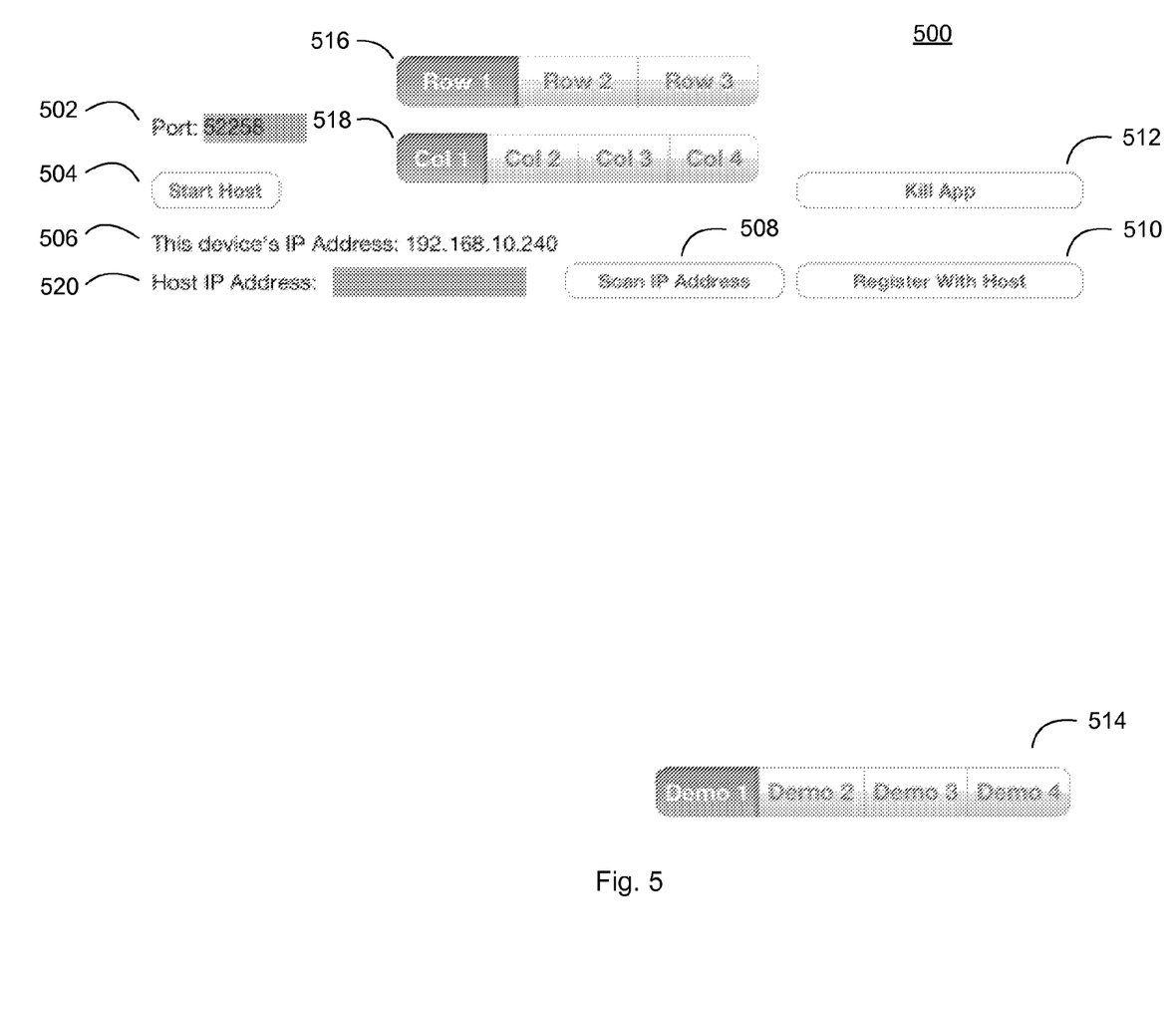
FIG. 5 illustrates an exemplary configuration interface of a device in client mode according to an embodiment of the present invention.

FIG. 5 illustrates an exemplary configuration interface of a device in client mode according to an embodiment of the present invention. A tablet device operating in a client mode may be configured using the user interface of an application illustrated in FIG. 5. It should also be noted that the device used in FIG. 5 may be the same device described with respect to FIG. 4. Any client device may be configured to operate as a host device using the start host button 504, and conversely, a host device may be configured to operate as a client device using the same or a similar button.

A port 502 for the device's TCP/IP communications may be set to '52258'. The IP address 506 indicates the device's IP address. Row and column buttons 516 and 518, indicates the current relative position or arrangement of the client device among a client device array. The position of the client device in the group of client devices can be set by selecting the appropriate selection using the row and column buttons 516, 518, respectively. The kill app command 512 may be selected to terminate the configuration application running on the client device. The client device may be configured to show a plurality of presentations 514 (in this example, one of four possible presentations of Demo 1, Demo 2, Demo 3 or Demo 4).

To allow a host device to assume control of the client device, the IP address of the client device should be communicated to and registered with the host device. This may be achieved using a variety of methods. One embodiment includes manually entering an IP address of the host device in the host IP address 520 field and then clicking the register with host button 510 to connect to the host device. Another embodiment includes the use of a QR code from the host device. The user interface of the host device includes a QR code embedded with configuration information, which was described above with respect to the description of FIG. 4.

The scan IP address button 508 may be selected which causes the application to initialize a system camera (e.g., a front facing camera). A user may then position the screen of the host device displaying the QR Code for capture and scan. Upon successful recognition and extraction of the configuration information from the QR code, the client device deactivates the camera and establishes a connection with the host device. In other embodiments, the QR code may be substituted with other two-dimensional barcodes, or a one-dimensional barcode. In yet another embodiment, radio-frequency identification codes carrying configuration data may be transmitted between the host and client devices using RFID tags, near field communication (NFC) technologies, Bluetooth, and other forms of short distance electronic communications. Further description and details of RFID and NFC systems may be found in U.S. Patent Application Publication No. 2008/0272889, entitled "NFC COMMUNICATORS AND NFC COMMUNICATIONS ENABLED DEVICES", which is hereby incorporated by reference in its entirety.

Once a client device has been connected to a host device, it may stay in a connected client mode. The connected client mode allows the client and host devices to send and receive messages, data or commands from each other. A register command or request may be sent from the client device to the host device. An array containing the device position and its IP address may be sent as parameters in the register command. When the host device receives this command, it uses the location information to identify an appropriate client position field (displayed on the host user interface) and populates the client's IP Address in that position field to register the client device. The client position field may serve as a user confirmation of device registration and used for communicating with the client device. The position sent to the host may be in the format of "RxCy" where 'x' is the row number and 'y' is the column number of the device. This is determined by the row and column selector buttons 516 and 518 on the client configuration screen.

Figure 6:
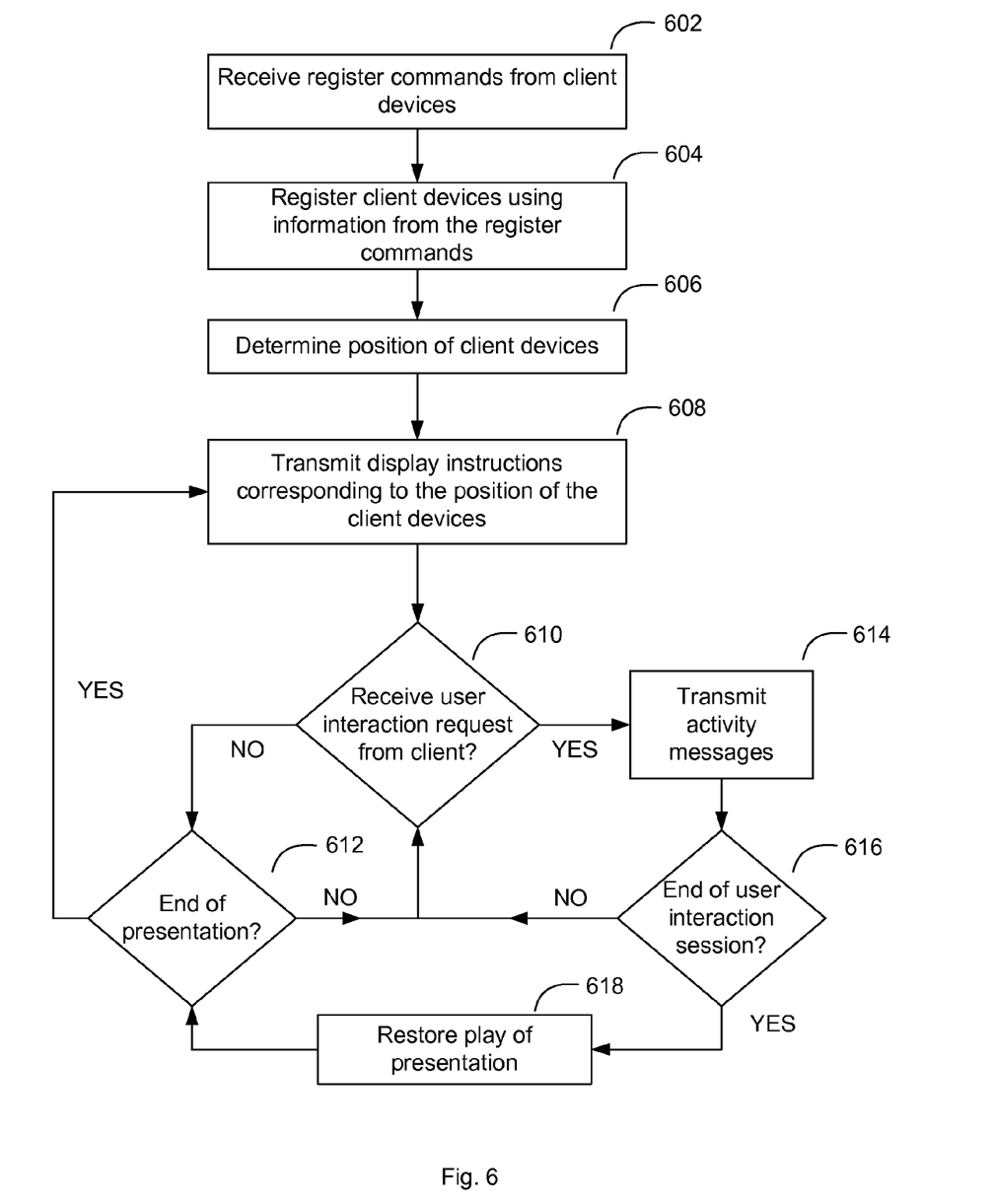
FIG. 6 illustrates a flowchart of a method for providing an interactive synchronized multi-screen display according to an embodiment of the present invention.

FIG. 6 presents a flowchart of a method for providing an interactive synchronized multi-screen display according to an embodiment of the present invention. The method of FIG. 6 may be executed on a tablet device configured to perform host operations (e.g., as a host device) as illustrated in FIG. 2 and FIG. 3, or on any other suitable processing device.

Register commands are received from a plurality of client devices in step 602. The register command may include the client devices' IP address and position within the multiple screen display configuration. For example, the position may be in the format of "RxCy" where 'x' is the row number and 'y' is the column number of a given device. According to other embodiments, the register command may instead include mathematical coordinates, geographical coordinates, or other types of location indicators. In a next step 604, information may be extracted from the register commands and used to register the client devices with the host device. The information extracted from the register commands are used to determine the positions of the client devices, step 606.

The position or arrangement information enables the host device to identify appropriate client position fields and to populate the client devices' IP addresses in the position fields. The position fields may be structured in an array stored in memory of the host device and used for communicating with the client devices. The host device may then transmit display instructions corresponding to the position of the client devices, step 608. Display instructions may be sent to each of the client devices to start a display of their respective portions of a whole or an entirety of a main presentation in a synchronized fashion. The instruction(s) may trigger client devices registered to the host device to initiate a main presentation loop.

The host device may subsequently monitor whether user interaction requests are received from the client devices, step 610. User interaction requests may be received from client devices receiving interactions from users that require communication between the client devices and the host device, such as a game. If there are no user interaction requests, the method may monitor for the end of the presentation, step 612. In the event that the presentation has not yet ended, the method may continue steps 610 and 612. The play instruction can be configured to be automatically resent after a number of seconds defined in a loop timing setting to coincide with the end of the presentation (a "YES" condition at step 612).

When a user interaction request is received from one or more client devices, the host device may transmit activity messages to the one or more client devices, step 614. The activity messages may include, for example, messages to initialize a game, display certain animations, provide a score, etc. The host device continues to monitor for user interaction requests and transmit activity messages until determining that the user interaction session has ended, step 616, while at the same time, resends play instructions to any client devices excluded from the user interaction session. A user session may end from user inactivity for a predetermined amount of time, or if a "game over" or termination condition has occurred. When a user session ends, the one or more client devices associated with the ended session may be re-synchronized with the excluded client devices and play of the presentation may be restored on the one or more client devices, step 618.

Figure 7:
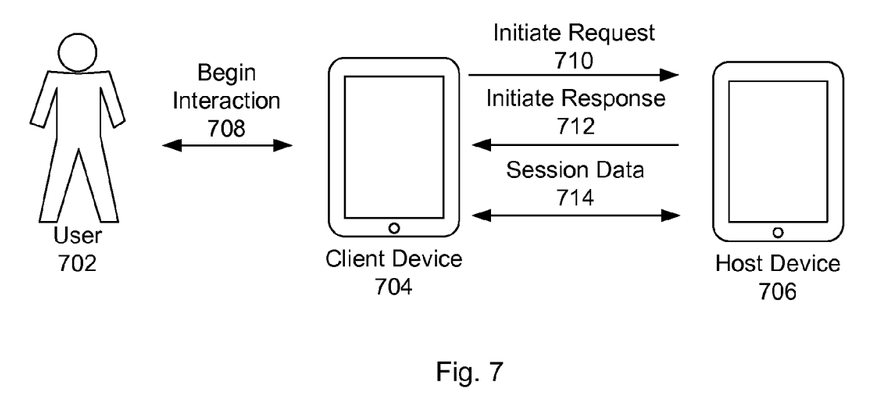
FIG. 7 illustrates a diagram of a client device and a host device at the start of a user interaction with the client device according to an embodiment of the present invention.

FIG. 7 presents a diagram of a client device and a host device at the start of a user interaction with the client device according to an embodiment of the present invention. An individual may interact with one or more client devices, causing them to "remove" themselves from the main presentation and dedicate themselves to generating an individual experience for the individual. At the beginning of an interaction 708 by a user 702 with a client device 704, an initiate request 710 may be communicated from client device 704 to host device 706. The user interaction 708 may interrupt the display of the main presentation at any given time during the presentation. The client device 704 may stop displaying the main presentation and temporarily dedicate itself to rendering a personalized experience for user 702.

The initiate request 710 may notify host device 706 that client device 704 is no longer displaying the main presentation. An initiate response 712 responsive to the initiate request 710 may be sent from host device 706 to client device 704. The initiate response 712 may be instructions or commands to initialize the personalized experience on client device 704, for example, a "StartGame" message. In an alternative embodiment, initiate request 710 may be a content request and initiate response 712 may be the content or content stream. In yet another embodiment, initiate request 710 may be a content request sent to a content server (not illustrated) and client device 704 may receive content responsive to the content request from the content server. Throughout the personalized experience, session data 714 may be communicated between client device 704 and host device 706. Session data 714 includes, but is not limited to, user selections, display instructions, notifications, etc.

Figure 8:
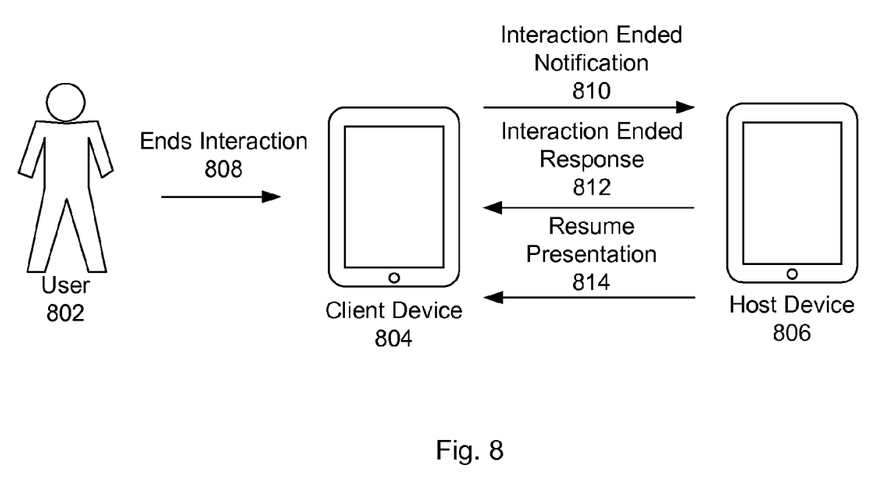
FIG. 8 illustrates a diagram of a client device and a host device at the end of a user interaction with the client device according to an embodiment of the present invention.

FIG. 8 illustrates a diagram of a client device and a host device at the end of a user interaction with the client device according to an embodiment of the present invention. A user 802 ends an interaction (808) with client device 804 and an interaction ended notification 810 may be transmitted from the client device 804 to host device 806. The user may explicitly end an interaction with client device 804 or alternatively, inactivity of the user 802 for a predetermined amount of time may indicate to client device 804 that the user has ended the interaction. Host device 806 may transmit an interaction ended response 812. The interaction ended response 812 may be, for example, a stop command to remove the personalized experience from display. Client device 804 may be synchronized to display the correct content and rejoin the main presentation via a resume presentation command 814.

FIGS. 1 through 8 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A system for displaying interactive content, the system comprising:
   a host device configured to:
   receive register commands from a plurality of client devices, the register commands including arrangement information of the plurality of client devices;
   register the plurality of client devices with the host device;
   determine a position for each of the plurality of client devices based on the arrangement information; and
   transmit display instructions to the plurality of client devices that causes the plurality of client devices to start display of respective portions of a first content corresponding to the position of the client devices in a synchronized fashion according to a first operation and display a second content related to the first content that is independent of the position of the client devices according to a second operation.

2. The system of claim 1 wherein the arrangement information indicates a position of a given client device within a multiple screen display arrangement.

3. The system of claim 1 wherein the arrangement information includes a row and column number associated with the position of a given client device.

4. The system of claim 1 wherein each of the register commands includes the client device's Internet Protocol address.

5. The system of claim 1 wherein the host device is further configured to generate a scannable configuration code.

6. The system of claim 5 wherein the scannable configuration code includes configuration information of the host device usable by the plurality of client devices to communicate with the host device.

7. The system of claim 5 wherein the scannable configuration code is a two-dimensional bar code.

8. The system of claim 5 wherein the scannable configuration code includes a radio-frequency identification code that is transmittable via at least one of near field communication, Bluetooth, and radio frequency identification tag technologies.

9. The system of claim 1 wherein the plurality of client devices are arranged in a multi-dimensional array of devices.

10. The system of claim 1 wherein the host device is one of the plurality of client devices.

11. The system of claim 10 wherein the host device is operable to perform host and client functions.

12. The system of claim 1 wherein the plurality of client devices are configured to provide an individual experience upon user interaction.

13. The system of claim 12 wherein the user interaction interrupts the display of respective portions of the whole presentation at any given time on a given one of the plurality of client devices during the presentation.

14. The system of claim 12 wherein the individual experience includes providing at least one of: games, quizzes, images, documents, and additional videos.

15. The system of claim 12 wherein the host device is further configured to transmit session data to the plurality of client devices providing the individual experience.

16. The system of claim 12 wherein providing the individual experience includes replacing the display of respective portions of the whole presentation with the individual experience.

17. The system of claim 16 wherein the plurality of client devices are configured to restore the display of respective portions of the whole presentation upon completion of the user interaction.

18. The system of claim 1 wherein the plurality of client devices are mounted on a surface in an arrangement consistent with the arrangement information.

19. A system for displaying interactive content, the system comprising:
a host device configured to:
receive register commands from a plurality of client devices, the register commands including arrangement information of the plurality of client devices,
register the plurality of client devices with the host device,
determine a position for each of the plurality of client devices based on the arrangement information, and
transmit display instructions to the plurality of client devices that causes the plurality of client devices to start display of respective portions of a first content corresponding to the position of the client devices in a synchronized fashion according to a first operation and display a second content related to the first content that is independent of the position of the client devices according to a second operation; and
the plurality of client devices in an arrangement consistent with the arrangement information, the plurality of client devices configured to:
receive the display instructions from the host device,
display the respective portions of the first content when operating in the first operation, and
display the second content when operating in the second operation.

20. A non-transitory computer readable medium comprising program code that when executed by a programmable processor causes execution of a method for displaying interactive content, the computer readable medium comprising:
computer program code for receiving register commands from a plurality of client devices, the register commands including arrangement information of the plurality of client devices;
computer program code for registering the plurality of client devices with the host device;
computer program code for determining a position for each of the plurality of client devices based on the arrangement information; and
computer program code for transmitting display instructions to the plurality of client devices that causes the plurality of client devices to start display of respective portions of a first content corresponding to the position of the client devices in a synchronized fashion according to a first operation and display a second content related to the first content that is independent of the position of the client devices according to a second operation.

* * * * *